US008976754B2

(12) United States Patent
Berggren et al.

(10) Patent No.: US 8,976,754 B2
(45) Date of Patent: *Mar. 10, 2015

(54) FEEDBACK INFORMATION RELATING TO A MOBILE COMMUNICATIONS SYSTEM USING CARRIER AGGREGATION

(71) Applicant: Huawei Technologies Co., Ltd., Shenzhen (CN)

(72) Inventors: Fredrik Berggren, Kista (SE); Jianghua Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 81 days.

This patent is subject to a terminal disclaimer.

(21) Appl. No.: 13/957,983

(22) Filed: Aug. 2, 2013

(65) Prior Publication Data

US 2013/0315176 A1    Nov. 28, 2013

Related U.S. Application Data

(63) Continuation of application No. 13/764,421, filed on Feb. 11, 2013, now Pat. No. 8,514,691, which is a continuation of application No. PCT/CN2010/076994, filed on Sep. 16, 2010.

(51) Int. Cl.
*H04W 4/00*        (2009.01)
*H04W 72/04*       (2009.01)
(Continued)

(52) U.S. Cl.
CPC ............ *H04W 72/042* (2013.01); *H04L 1/1692* (2013.01); *H04W 72/02* (2013.01); *H04W 72/0466* (2013.01); *H04L 1/1812* (2013.01); *H04L 1/1861* (2013.01); *H04L 5/0055* (2013.01)
USPC .......................................................... 370/329

(58) Field of Classification Search
USPC .................. 370/252, 329, 335, 336, 342, 469
See application file for complete search history.

(56) References Cited

U.S. PATENT DOCUMENTS

2009/0274230 A1*   11/2009   Heath et al. .................... 375/260
2010/0189051 A1     7/2010   Li et al.
(Continued)

FOREIGN PATENT DOCUMENTS

CN         101588224 A     11/2009
WO     WO 2010128817 A2    11/2010

OTHER PUBLICATIONS

International Search Report issued in corresponding PCT Patent Application No. PCT/CN2010/076994, mailed Jul. 7, 2011.
(Continued)

*Primary Examiner* — Raj Jain
(74) *Attorney, Agent, or Firm* — Brinks Gilson & Lione

(57) ABSTRACT

The invention relates to a method for encoding a number of feedback information messages in a mobile radio communications system using carrier aggregation, the method comprising: encoding the number of feedback information messages by a set of codewords, where each feedback information message can be of at least a first kind or a second kind. The method is distinguished by that for at least one feedback information message there is at least one codeword corresponding to information of the first kind and at least one codeword corresponding to information of the second kind, wherein the modulation symbol of one of said at least one codeword corresponding to information of the first kind and the modulation symbol of one of said at least one codeword corresponding to information of the second kind have a maximum distance. The invention also relates to a mobile terminal and radio basestation for a communications system.

17 Claims, 4 Drawing Sheets

(51) Int. Cl.
*H04L 1/16* (2006.01)
*H04W 72/02* (2009.01)
*H04L 1/18* (2006.01)
*H04L 5/00* (2006.01)

(56) References Cited

U.S. PATENT DOCUMENTS

| | | | |
|---|---|---|---|
| 2010/0220675 A1* | 9/2010 | Chun et al. | 370/329 |
| 2010/0281333 A1* | 11/2010 | Jongren et al. | 714/752 |
| 2011/0026601 A1* | 2/2011 | Mueller et al. | 375/240.24 |
| 2011/0122819 A1* | 5/2011 | Jongren et al. | 370/328 |
| 2011/0286544 A1* | 11/2011 | Avudainayagam et al. | 375/295 |

OTHER PUBLICATIONS

Huawei, "Analysis and Evaluation of Extended Channel Selection" Agenda Item 6.2.4.1, 3GPP TSG RAN WG1 Meeting #61. Montreal, Canada, May 2010.

LTE, "3rd Generation Partnership Project; Technical Specification Group Radio Access Network; Evolved Universal Terrestrial Radio Access (E-UTRA); Physical Layer Procedures" (Release 2010) 3GPP TS 36.213, V9.3.0, Sep. 2010.

Qualcomm Inc., "Introduction of Rel-10 LTE-Advanced Features in 36.212" Draft Change Request, 36.212 CR CRNum, Current Version 9.2.0. 3GPP TSG-RAN Meeting #62, Madrid, Spain, Aug. 23-27, 2010. R1-104971.

Extended European Search Report issued in corresponding European Patent Application No. 10857137.3, mailed Jun. 21, 2013, 7 pages.

* cited by examiner

FEEDBACK INFORMATION RELATING TO A MOBILE COMMUNICATIONS SYSTEM USING CARRIER AGGREGATION

CROSS-REFERENCE TO RELATED APPLICATIONS

This application is a continuation of U.S. patent application Ser. No. 13/764,421, filed on Feb. 11, 2013, which is a continuation of International Application No. PCT/CN2010/076994, filed on Sep. 16, 2010, The afore-mentioned patent applications are hereby incorporated by reference in their entireties.

FIELD OF THE INVENTION

The present invention concerns a method for encoding a number of feedback information messages in a mobile radio communications system using carrier aggregation. Further it concerns a mobile terminal and a radio basestation for a mobile radio communications system.

BACKGROUND ART

In Long Term Evolution Advanced (LTE-Advanced) systems, multiple component carriers can be aggregated in uplink and downlink, respectively. For example, to provide high data rates, the User Equipment (UE) can receive simultaneous transmissions on multiple downlink component carriers. For one UE, each component carrier is used for transmission of 1 transport block (2 transport blocks for Multiple Input Multiple Output (MIMO) transmission). If the detection of a transport block is successful, the UE sends an Acknowledgement (ACK) on the uplink and if the detection was unsuccessful, a Negative Acknowledgement (NACK) is sent. An ACK may be represented with a bit taking the value '1' and a NACK may be represented with the value '0'. Thus, with carrier aggregation, multiple ACK or NACK bits need to be transmitted from one UE in response to the transmitted transport blocks over different component carriers.

Sometimes the notion of a cell is used instead of component carrier, and aggregation could equivalently be for cells. In an aggregation case the User Equipment may be configured with multiple serving cells. A cell may provide both an uplink and a downlink direction of communication and may thus comprise both an uplink and downlink component carrier. A UE can be assumed to have a Primary serving cell (PCell) as well as one or several Secondary serving cells (SCells). A person skilled in the art could equivalently use the terminology of cells instead of component carriers in relation to carrier aggregation.

Before detecting the transport block, a downlink control channel first needs to be detected which contains the downlink assignment information needed to receive the data channel and to decode the transport block. If the UE did not correctly receive the control channel, the UE is not aware of that it is expected to receive any data channel and it does not send any feedback, neither ACK nor NACK in the uplink. This is referred to as discontinuous transmission (DTX). The eNB knows when to expect a NACK or ACK and upon DTX detection, the eNodeB would have to initiate a re-transmission, if it performed a data transmission. One downlink control channel transmission contains the assignments for both transport blocks in a MIMO transmission. Hence, DTX applies to both transport blocks simultaneously for MIMO.

In addition to missing a downlink assignment, the ACK/NACK signalling in the uplink may be erroneous, e.g., a transmitted ACK may be received as a NACK, or a transmitted NACK may be received as an ACK. A NACK-to-ACK error may introduce Hybrid automatic repeat request (HARQ) buffer corruption in the receiver due erroneous combining of several transmissions, since the User Equipment (UE) may expect a retransmission while the basestation (for instance eNodeB in the Long Term Evolution (LTE) communications system) schedules a new packet. An ACK-to-NACK error causes inefficient system operation due to unnecessary retransmissions which the UE is not expecting. It is therefore important to provide robust ACK/NACK signalling. To assure proper system performance, the LTE specifications list requirements on the ACK/NACK error performance.

Channel selection is one method that is feasible for transmission of multiple Acknowledgement (ACK) and Negative Acknowledgement (NACK) bits. The transmission is performed by Quadrature Phase Shift Keying (QPSK) (or other modulation order symbol) modulated sequences and the feedback information is encoded by both the selection of the channel in the form of a sequence and the QPSK constellation point. The channel selection refers to the selection of the sequence and several sequences can be transmitted on the same frequency resource. That is, channels are obtained by Code Division Multiplexing (CDM) of sequences. A UE is typically only transmitting on one channel at a time. Therefore, since only one sequence is selected and transmitted for one User Equipment (UE), channel selection preserves the single-carrier property of the signal which is beneficial for keeping a low Peak to Average Power Ratio (PAPR) of the UE. This feedback principle was used already in Long Term Evolution (LTE) Rel-8 for Time Division Duplex (TDD), where ACK/NACKs from multiple downlink subframes are signalled by one transmission in a single uplink subframe. For LTE-Advanced, channel selection will also be used, but in the context of conveying ACK/NACKs from multiple component carriers, i.e., carrier aggregation. This applies for up to of 4 ACK/NACK bits and also includes the Frequency Division Duplex (FDD) case. Each transport block generally requires one ACK/NACK bit, thus 4 bits may correspond to a configuration of 2 component carriers with MIMO transmission on each.

To encode the ACK/NACK/DTX information, a mapping is needed between the different states of ACK, NACK and DTX, and the channels and QPSK constellation points. These mapping tables exist for channel selection for TDD in Rel-8, but new mappings are needed for carrier aggregation in LTE-Advanced because of different combinations of ACK/NACK/DTX will need to be encoded and that the availability and reservation of the channels will differ.

Transmission of ACK/NACKs for carrier aggregation by means of channel selection requires a codebook where for each valid combination of ACK/NACK/DTX, one channel and one constellation point should be assigned and there is thus a need for such a scheme for a mobile radio communications system that employ carrier aggregation.

SUMMARY OF THE INVENTION

It is an object of the present invention to propose a solution for or a reduction of the problems of prior art. A main object is consequently to devise a suitable scheme for feedback information messages for a mobile communications system using carrier aggregation.

According to the invention this is accomplished by a method for encoding a number of feedback information messages in a mobile radio communications system using carrier aggregation, the method comprising: —encoding the number of feedback information messages by a set of codewords, where each feedback information message can be of at least a first kind or a second kind and each codeword comprises a channel selected from a number of A channels and a modulation symbol selected from a number of S modulation symbols. The method is distinguished by that for at least one feedback information message there is at least one codeword corresponding to information of the first kind and at least one codeword corresponding to information of the second kind, for which said at least one feedback information message the modulation symbol of one of said at least one codeword corresponding to information of the first kind and the modulation symbol of one of said at least one codeword corresponding to information of the second kind have a maximum distance, and wherein the codewords comprise the same channel and a different modulation symbol, and wherein for said at least one feedback information message at least one of the S symbols is unused for any codeword comprising said same channel.

Thus, by means of this method a scheme for feedback information messages in a mobile radio communications system is devised. Since symbols of codewords representing a first and a second kind of information have a maximum separation when they are transmitted over the same channel it is ensured that the likelihood of such symbol to be confused for each other is minimised. That is, the likelihood that a first kind of information was sent but detected as a second kind of information is minimised.

The invention involves the realisation that codewords using both channel selection and phase information of symbols transmitted over the channel have an unsymmetrical probability for detection since detecting that energy was sent over a channel is much easier than detecting a phase of a symbol. It was further realised that this property could be exploited in this context by ensuring that feedback information messages that are the least desirable to be mixed up at detection should be separated the most in regard of their modulation symbols.

Thus, the invention provides the insight that codebook design impacts the ACK-to-NACK and NACK-to-ACK error probabilities and that assigning the channels and constellation points to the valid ACK/NACK/DTX states such that the error probability of a state is minimised can be done by ensuring that codewords representing different kinds of information have a maximum separation in regard of their respective modulation symbols.

The invention also concerns a mobile terminal and a radio basestation having the equivalent advantages as the method according to the invention.

Further advantageous embodiments are disclosed in the dependent claims.

BRIEF DESCRIPTION OF THE DRAWINGS

Embodiments exemplifying the invention will now be described, by means of the appended drawings, on which

DETAILED DESCRIPTION OF THE INVENTION

Figure 1:
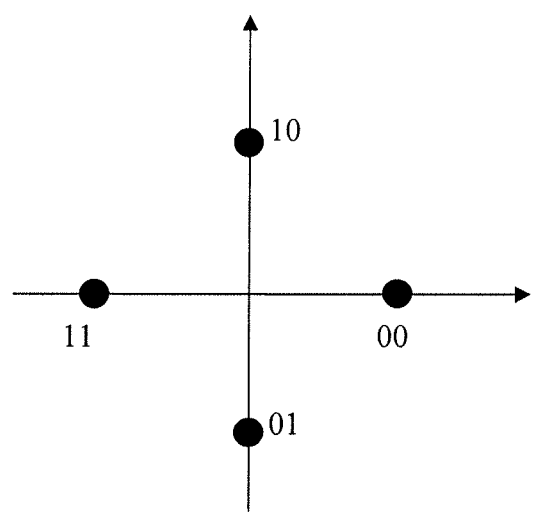
FIG. 1 illustrates a Gray coded QPSK constellation.

Consider a set of A channels ($n_{PUCCH}(0), \ldots, n_{PUCCH}(A-1)$) and $2^m$-ary modulation (m=2 for QPSK) where 1 channel out of A is chosen and one of the $2^m$ modulation symbols are transmitted on this channel. In this way up to $A \cdot 2^m$ states of information can be encoded. This way of signalling is referred to as channel selection. In LTE a channel comprises a sequence, and a QPSK symbol modulates the sequence. Without the loss of generality, QPSK symbol is assumed in the following description.

A codeword can be defined as the concatenation of the channel index and the bits of the QPSK symbol ($n_{PUCCH}(k)$, $b(0), \ldots, b(m-1)$), $k \in \{0, 1, \ldots, A-1\}$, $b(i) \in \{0,1\}$. Thus the codeword elements may have different alphabets. Each valid codeword represents one information state. Since the first element, $n_{PUCCH}(k)$, is conveyed by the selection of a channel and the other elements $b(0), \ldots, b(m-1)$ are conveyed by a modulation symbol, the detection performance differs among the elements in the codeword. The first element relates to the usage of a channel and can be detected by energy detection or a correlator, whereas the modulation symbols must be detected by the phase of the received signal. Typically the energy detection can be made much more reliably than the symbol detection. Therefore, the design of a codebook must consider that the codeword elements are not equally reliable. One consequence is that the error probability (e.g., NACK-to-ACK or ACK-to-NACK errors) is primarily due to the erroneous detection of the modulation symbol and will depend on which codeword that is assigned to encode a certain information. The assignments of modulation symbols and channels must therefore be made judiciously to reduce the error events.

A codebook of size N comprises the mapping of the set of N information states to the codewords. Typically this information includes, but is not limited to, one or several entities of ACK, NACK, NACK/DTX or DTX. A joint state NACK/DTX typically implies that the eNodeB will perform a retransmission. If $N \leq A \cdot 2^m$, the number of codewords being used is not more than the total number of available codewords so the receiver is able to unambiguously determine each encoded information state. Each information state may be further comprised of one or several fields, e.g., denoted here by HARQ-ACK(i), where each field represents the feedback information for a given transport block. We interchangeably also refer to such a field as a feedback information message. The state of this field may be at least any of ACK, NACK, NACK/DTX or DTX. If two carriers (or cells) are aggregated, HARQ-ACK(0) could represent the feedback information message for component carrier 0 and HARQ-ACK(1) could represent component carrier 1. An information message may be associated with dynamically scheduled transmissions as well as the data transmission associated with a semi-persistent scheduling release control channel.

In LTE, if MIMO transmission is employed, 2 transport blocks are sent and each transport block needs its own feedback information. Thus a codebook with 4 fields, HARQ-ACK(0) to HARQ-ACK(3) is needed if 2 carriers with MIMO are aggregated. A codebook with 4 fields could also be used in aggregation of 4 carriers without MIMO. Similarly a codebook with 3 fields could be used in aggregation of 3 carriers without MIMO, or aggregation of 2 carriers where one carrier uses MIMO.

To minimize the error probability, knowing that errors primarily come from erroneous modulation symbol detection, this invention includes a construction of the codebook wherein for at least one HARQ-ACK field (feedback information message), modulation symbols for a given HARQ-ACK field are separated as far as part as possible among the codewords that represent different information and share the same channel $n_{PUCCH}$. This minimizes the NACK-to-ACK and NACK-to-ACK probability given that the channel is correctly detected.

This is illustrated in the following example, where Gray coded QPSK according to FIG. 1 and the following codebook are considered, wherein DTX is mapped to NACK when applicable. This mapping is done considering HARQ-ACK(0) and HARQ-ACK(1) representing the feedback information messages for MIMO transmission on a first component carrier and HARQ-ACK(2) representing the feedback information message on a second component carrier. The number of codewords is N=8 and 3 channels are used.

TABLE 1

Example codebook for HARQ-ACK multiplexing with 3 bits.

| Entry Number | HARQ-ACK(0), HARQ-ACK(1), HARQ-ACK(2) | $n_{PUCCH}$ | b(0), b(1) |
|---|---|---|---|
| 1 | ACK, ACK, ACK | $n_{PUCCH}(2)$ | 1, 1 |
| 2 | ACK, ACK, NACK/DTX | $n_{PUCCH}(0)$ | 1, 1 |
| 3 | ACK, NACK, ACK | $n_{PUCCH}(0)$ | 1, 0 |
| 4 | ACK, NACK, NACK/DTX | $n_{PUCCH}(1)$ | 1, 0 |
| 5 | NACK, ACK, ACK | $n_{PUCCH}(1)$ | 0, 1 |
| 6 | NACK, ACK, NACK/DTX | $n_{PUCCH}(0)$ | 0, 1 |
| 7 | NACK/DTX, NACK/DTX, ACK | $n_{PUCCH}(2)$ | 0, 1 |
| 8 | NACK/DTX, NACK/DTX, NACK/DTX | $n_{PUCCH}(2)$ | 0, 0 |
| 9 | DTX, DTX, DTX | N/A | N/A |

The channels used in the codebook could be assumed to be transmitted on one antenna port. If the UE is equipped with multiple antenna ports, a generalization of the notation could be that channel $n^{(p)}_{PUCCH}(k)$ is used on antenna port p. The features of this invention are not limited to a single antenna port but could be generalized for a person skilled in the art such that said features hold for any of one or several antenna ports. For example, it could be considered to have one codebook per antenna port, each codebook having the features of this invention.

To gain further insight on the codebook construction, the codewords can be further arranged according to the encoded information for each HARQ-ACK field as follows, assuming NACK and NACK/DTX is grouped together.

TABLE 2

Grouping of codewords from the codebook in Table 1.

| NACK, NACK/DTX | | | ACK | | |
|---|---|---|---|---|---|
| HARQ-ACK(0) | HARQ-ACK(1) | HARQ-ACK(2) | HARQ-ACK(0) | HARQ-ACK(1) | HARQ-ACK(2) |
| ($n_{PUCCH}(1)$, 0, 1) | ($n_{PUCCH}(0)$, 1, 0) | ($n_{PUCCH}(0)$, 1, 1) | ($n_{PUCCH}(2)$, 1, 1) | ($n_{PUCCH}(2)$, 1, 1) | ($n_{PUCCH}(2)$, 1, 1) |
| ($n_{PUCCH}(0)$, 0, 1) | ($n_{PUCCH}(1)$, 1, 0) | ($n_{PUCCH}(1)$, 1, 0) | ($n_{PUCCH}(0)$, 1, 1) | ($n_{PUCCH}(0)$, 1, 1) | ($n_{PUCCH}(0)$, 1, 0) |
| ($n_{PUCCH}(2)$, 0, 1) | ($n_{PUCCH}(2)$, 0, 1) | ($n_{PUCCH}(0)$, 0, 1) | ($n_{PUCCH}(0)$, 1, 0) | ($n_{PUCCH}(1)$, 0, 1) | ($n_{PUCCH}(1)$, 0, 1) |
| ($n_{PUCCH}(2)$, 0, 0) | ($n_{PUCCH}(2)$, 0, 0) | ($n_{PUCCH}(2)$, 0, 0) | ($n_{PUCCH}(1)$, 1, 0) | ($n_{PUCCH}(0)$, 0, 1) | ($n_{PUCCH}(2)$, 0, 1) |

We will now further describe a possible embodiment of the invention in the terms of a method for encoding a number of feedback information messages in a mobile radio communications system. This system is using carrier aggregation as described previously. The method can be extended and modified, as detailed in later paragraphs. In a basic version the method comprises to encode the number of feedback information messages by a set of codewords, where each feedback information message can be of at least a first kind or a second kind. As mentioned, the at least two different kinds of information can correspond to a positive or negative acknowledgement (ACK/NACK/DTX) of previously sent data. Each codeword comprises a channel selected from a number of A channels and a modulation symbol selected from a number of S modulation symbols. Now, the codebook of codewords is arranged according to the invention such that for at least one feedback information message there is at least one codeword corresponding to information of the first kind and at least one codeword corresponding to information of the second kind, and for which said at least one feedback information message the modulation symbol of one of said at least one codeword corresponding to information of the first kind and the modulation symbol of one of said at least one codeword corresponding to information of the second kind have a maximum distance. That is, in a constellation diagram these two codewords are separated as much as is possible in that diagram. For instance, in FIG. 1 symbols 10 and 01 have a maximum distance and likewise symbols 11 and 00 are also separated the most. Further, according to this method, the codewords comprise the same channel and a different modulation symbol. Also, for said at least one feedback information message at least one of the S symbols is unused for any codeword comprising said same channel.

In this method, the maximum distance may be a Euclidean distance in a signal space, as has been exemplified previously in connection with FIG. 1. The meaning of the term maximum distance in the context of the invention is that the two modulation symbols are chosen such that the probability of erroneously detecting one of them when the other was sent is minimised for the available set of symbols.

In one embodiment of the method according to the invention, there is, for the at least one feedback information message, only one codeword corresponding to information of the first kind and only one codeword corresponding to information of the second kind. This embodiment is described as an example below.

In this first embodiment, the invention applies to the case where for a HARQ-ACK field, one codeword is used for encoding information of a first kind (e.g., NACK and NACK/DTX) and one codeword is used for encoding information of a second kind (e.g., ACK) and both codewords comprise the same channel and no other codewords in this HARQ-ACK field use that channel.

Consider HARQ-ACK(0) in Table 2 and suppose codeword ($n_{PUCCH}(1)$,0,1) was transmitted. This codeword represents NACK or NACK/DTX for HARQ-ACK(0). A codeword that represent a different information, i.e., ACK, for HARQ-ACK(0) which comprises the same channel is ($n_{PUCCH}(1)$,1,0). No other codewords in HARQ-ACK(0) use channel $n_{PUCCH}(1)$. If the channel is correctly detected, a NACK-to-ACK error occurs if ($n_{PUCCH}(1)$,1,0) if is detected. According to this invention, the error events are primarily due to the detection of the modulation symbols, both the NACK-to-ACK and ACK-to-NACK error probabilities are minimized by that the modulation symbols for these two codewords are chosen such that their distance is maximized. This is seen in FIG. 1 where the constellation points corresponding to (b(0),b(1))=(0,1) and (b(0),b(1))=(1,0) are maximally far apart. It can be further seen in Table 2 that the same principle of assigning modulation symbols with maximum distance is maintained for HARQ-ACK(1) and HARQ-ACK(2) for all codewords that contain $n_{PUCCH}(1)$, in each field (feedback information message) respectively.

In a second embodiment of the method according to the invention, there is, for the at least one feedback information message, one codeword corresponding to information of a first kind and two codewords corresponding to information of a second kind. This is exemplified in the following.

In this second embodiment, the invention applies to the case where for a HARQ-ACK field, two codewords are used for encoding information of a first kind (e.g., NACK and NACK/DTX) and one codeword is used for encoding information of a second kind (e.g., ACK) and all codewords comprise the same channel and no other codewords in this HARQ-ACK field comprise that channel.

For example in Table 2, for HARQ-ACK(0), the codewords $(n_{PUCCH}(2),0,1)$ and $(n_{PUCCH}(2),0,0)$ represent NACK or NACK/DTX. A codeword that represent a different information, i.e., ACK, for HARQ-ACK(0) which comprises the same channel is $(n_{PUCCH}(2),1,1)$. If the channel is correctly detected, a NACK-to-ACK error occurs if $n_{PUCCH}(2),1,1)$ is detected. According to this invention this error probability is minimized by that the modulation symbols for these three codewords are chosen such that the distance of the modulation symbols is maximized between at least two of the codewords that represent different information. For example codeword $(n_{PUCCH}(2),0,0)$ has the maximum distance from codeword $(n_{PUCCH}(2),1,1)$. This is seen in FIG. 1 where the constellation points corresponding to (b(0),b(1))=(1,1) and (b(0),b(1))=(0,0) are maximally far apart. It can be further seen in Table 2 that the same principle of assigning modulation symbols with maximum distance is maintained for HARQ-ACK(1) and HARQ-ACK(2), for any case where there are codewords for which the same channel is used several times. For NACK or NACK/DTX, this includes channels 2, 2, 0, for HARQ-ACK(0), HARQ-ACK(1) and HARQ-ACK(2), respectively. For ACK, this includes channels 0, 0, 2, for HARQ-ACK(0), HARQ-ACK(1) and HARQ-ACK(2), respectively.

In a further, third, embodiment of the method according to the invention, there is, for the at least one feedback information message, more than one codeword corresponding to information of a first kind and more than one codewords corresponding to information of a second kind, and the number of codewords is the same for the information of a first and second kind.

In this third embodiment, the invention applies to the case where for a HARQ-ACK field, K>1 codewords are used for encoding information of a first kind (e.g., NACK and NACK/DTX) and K codewords are used for encoding information of a second kind (e.g., ACK) and all codewords comprise the same channel and no other codewords in this HARQ-ACK field comprise that channel.

According to this invention the error probability is minimized by that the modulation symbols for these 2K codewords are chosen such that the distance of the modulation symbols is maximized between at least one of the codewords representing information of a first kind and at least one of the codewords representing information of a second kind.

For any of the variants of the method according to the invention, a first kind of information may be any combination or single state of Negative-Acknowledgement (NACK), Negative-Acknowledgement (NACK)/Discontinuous Transmission (DTX). Discontinuous Transmission (DTX) and a second kind of information comprises Acknowledgement (ACK). This does not preclude that the first and second kind of information can be some other sort of information or even that there may be more sorts of information such as a third kind of information.

For any of the variants of the method according to the invention, the at least one feedback information message may relate to Multiple Input-Multiple Output (MIMO) feedback.

Further, the at least one feedback information message according to the method of the invention may relate to Hybrid automatic repeat request (HARQ).

Further, in any variant of the method according to the invention each of the A channels may correspond to a sequence such as a quasi-orthogonal sequences used in Code Division Multiplexing. Such a sequence could have a two dimensional mapping, for instance in time and frequency. However, other communication channels are not ruled out.

The method according to the invention may be employed with a same channel distribution for at least two of the feedback information messages. A further possibility is that there is a same channel distribution for all of said feedback information messages.

Since each codeword comprises both a channel and multiple symbols, one codeword may encode a plurality of feedback information messages.

The method of the invention governs the properties of at least one feedback information message, such that the advantage of maximum likelihood of correct detection of the first and second kind of feedback information for that feedback information message is attained. However, the properties of the at least one feedback information message may apply for all feedback information messages, such that this maximum likelihood is attained for all such messages. This entails an optimisation of the complete information feedback mechanism.

The feedback information messages can be further encoded according to the method according to the invention, such that in regard of a feedback information message there is a pattern, the pattern comprising:

a first number of codewords comprising the same channel and related to a first kind of information and a second number of codewords comprising said same channel and related to a second kind of information, and wherein said pattern holds true for all feedback information messages. That is to say that if, for instance, for one feedback information message there are two codewords comprising the same channel and are related to NACK (i.e. a first number is two) and for that same feedback information message there is one codeword (i.e. a second number is one) comprising that same channel and is related to ACK. Then this pattern of 2+1 codewords is repeated for all the other feedback information messages. However, the channels used for codewords encoding the other feedback information messages may be different between feedback information messages but they are the same within the same feedback information message.

Consider for instance Table 2: for NACK/ACK columns for HARQ-ACK(0) (one feedback information message), there are two codewords comprising the same channel and related to information of a first kind (NACK,NACK/DTX): $n_{PUCCH}(2),0,1)$ and $(n_{PUCCH}(2),0,0)$. Further, for the same feedback information message there is one codeword comprising that same channel $(n_{PUCCH}(2))$ and is related to information of a second kind (ACK): $(n_{PUCCH}(2),1,1)$, Now, looking at the other two feedback information messages we can identify this same pattern. For HARQ-ACK(1): two codewords for NACK,NACK/DTX: ($n_{PUCCH}(2),0,1$) and ($n_{PUCCH}(2),0,0$), one codeword for ACK: ($n_{PUCCH}(2),1,1$). For HARQ-ACK(2): two codewords for NACK,NACK/DTX: $n_{PUCCH}(0),1,1$) and ($n_{PUCCH}(0),0,1$), one codeword for ACK: ($n_{PUCCH}(0),1,0$). Thus, the same pattern is repeated for all three feedback information messages. Note that the channel only has to be the same within the same feedback information message, not between feedback information messages. For the first two feedback information messages of this example the channel is $n_{PUCCH}(2)$, whereas for the last feedback information message the channel is $n_{PUCCH}(0)$. Thus this is a 2+1 pattern example from Table 2. In the same way a 1+1 and a 1+2 pattern example can be shown to exist in Table 2. Likewise, for instance, in table 14 there is a 1+1 pattern across all feedback information messages.

The number of feedback information messages according to the method of the invention may for instance be any of: 2, 3, or 4. Even a higher number of messages are possible given that there are enough modulation symbols available to encode them.

In the method according to the invention, the number of modulation symbols S may for instance be four. One instance of such a modulation using four symbols is Gray coded Quadrature Phase Shift Keying (QPSK). There are however no restrictions inherent in the method on using other modulations and therefore the number of modulation symbols may be other than four. For instance, 8-Phase Shift Keying employing eight symbols may be used.

The method according to the invention is also not restricted to any particular mobile radio communications system and may be put to use in any mobile radio communications system that employs carrier aggregation, for instance Long Term Evolution (LTE) Advanced.

The A channels in the method according to the invention may be reserved for, for instance, a particular User Equipment (UE) by any of: implicit reservation, explicit signalling or a combination of implicit reservation and explicit signalling. Implicit reservation would mean that the User Equipment observes the behaviour of the radio basestation and figures out what channels to use based on a predetermined rule. For instance, based on what channel the radio basestation decides to send some other message on, the UE may use that information to decide what channels it is supposed to use for codewords according to the invention. For example the time-frequency resource used for transmitting the associated downlink control channel may implicitly relate to a unique channel. Explicit signalling would involve an explicit message indicating what channels to use. A combination of implicit and explicit reservation could be useful for instance when the implicit reservation cannot offer sufficient amount of unique channels, or there is not enough entropy in the communication between the UE and the basestation to implicitly convey all the information on what channels are to be used. In that case the remaining information could be complemented with explicit signalling.

In case there is a need for some further flexibility, the method according to the invention may comprise that said feedback information messages are configured by higher layer signalling. In this way, feedback information message configuration can change according to circumstances, while still retaining the properties specified in accordance with the invention. For example, the number of feedback information messages can be configured depending on the number of configured serving cells and the downlink transmission mode for each serving cell.

It should be pointed out that for the method according to the invention, the set of codewords may constitute a subset of a larger set of codewords. That is, there may be a larger codebook that does not necessarily have the properties of the set of codewords according to this invention, but which larger codebook comprises a subset of codewords which do have those properties. This subset of the larger codebook may have been taken out by only using a subset of the codewords of said larger codebook.

It is also possible to envision that the method according to the invention can be used in conjunction with multiple antenna ports of for instance a user equipment. That is, if the number of feedback information messages coded by codewords are said to constitute a first codebook and there is at least one additional codebook having the properties of the first codebook, then each of the first codebook and the at least one additional codebook could be designated to a respective antenna port. This was also touched upon above.

It must be stressed that all variants and embodiments of the method according to the invention described above can be combined as long as there is no inherent contradiction for such a combination. For instance, combining the basic method of the invention with that the number of modulation symbols are four and that each of the channels corresponds to a sequence is perfectly possible and therefore this constitutes a valid combination. On the contrary, combining the basic method of the invention with that:

for the at least one feedback information message, there is only one codeword corresponding to information of the first kind and only one codeword corresponding to information of the second kind, together with that:

for the at least one feedback information message, there is one codeword corresponding to information of a first kind and two codewords corresponding to information of a second kind, is not valid since they are contradictory considering the codewords comprising the same channel.

All valid combinations are considered to be disclosed in the foregoing.

Figure 2:
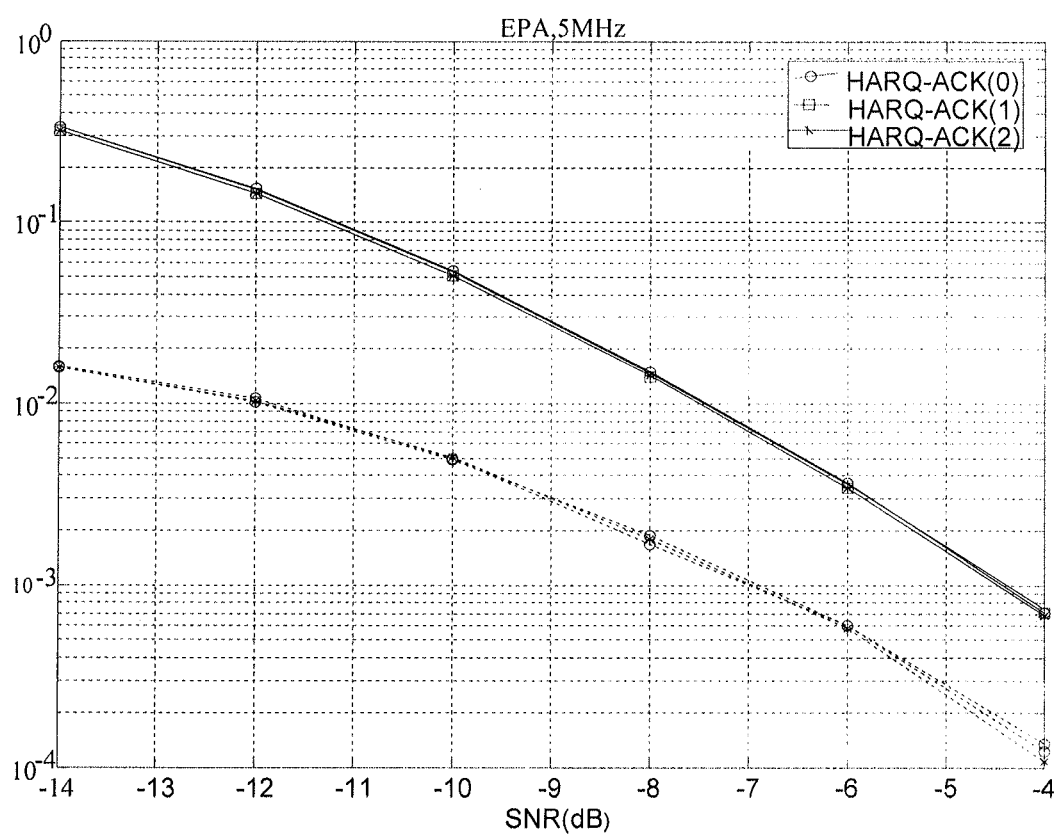
FIG. 2 illustrates Plots for Probability [NACK→ACK] (dash with mark) and Probability [ACK→NACK/DTX] (solid with mark) for Table 1.
Figure 3:
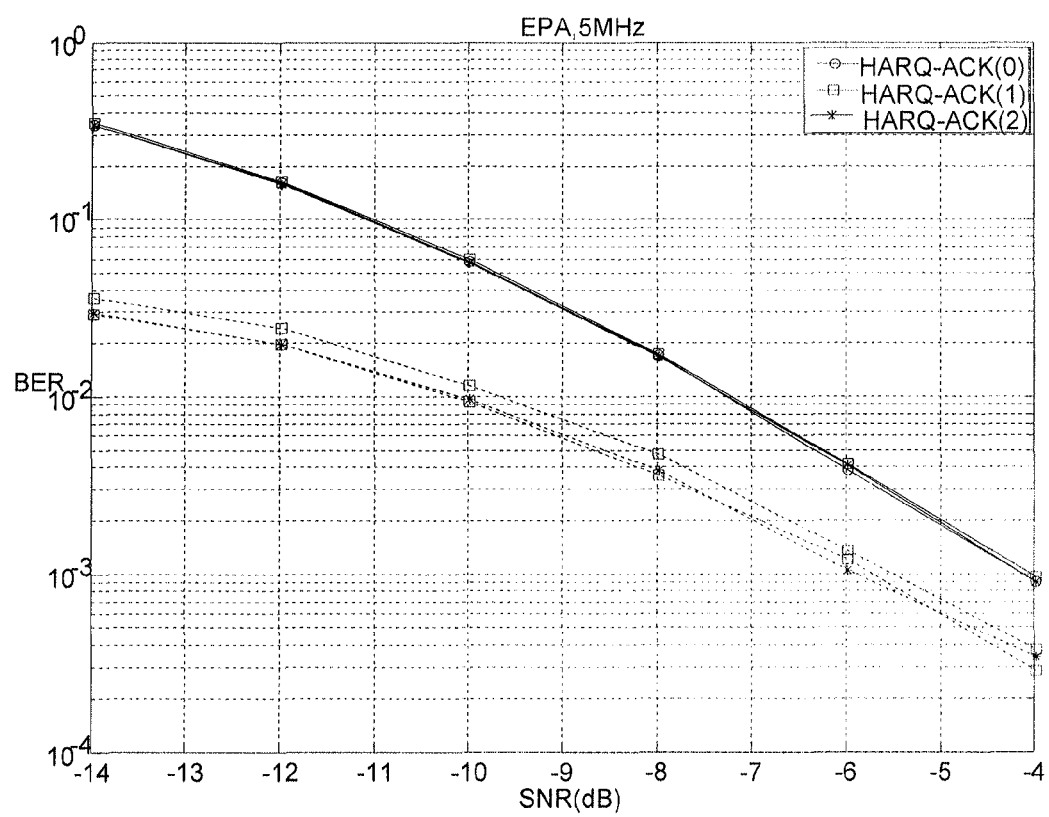
FIG. 3 illustrates Plots for Probability [NACK→ACK] (dash with mark) and Probability [ACK→NACK/DTX] (solid with mark) for Table 3.

In order to exemplify performance of the invention, FIG. 2 contains a numerical evaluation of detection performance using the codebook of Table 1. Table 3 shows one example of a codebook which does not apply the allocation of modulation symbols according to this invention. FIG. 3 shows that the performance is significantly worse for this exemplary codebook.

TABLE 3

Example codebook for HARQ-ACK multiplexing with 3 bits.

| Entry Number | HARQ-ACK(0), HARQ-ACK(1), HARQ-ACK(2) | $n_{PUCCH}$ | b(0), b(1) |
|---|---|---|---|
| 1 | ACK, ACK, ACK | $n_{PUCCH}(2)$ | 1, 1 |
| 2 | ACK, ACK, NACK/DTX | $n_{PUCCH}(0)$ | 1, 1 |
| 3 | ACK, NACK, ACK | $n_{PUCCH}(0)$ | 1, 0 |
| 4 | ACK, NACK, NACK/DTX | $n_{PUCCH}(1)$ | 1, 1 |
| 5 | NACK, ACK, ACK | $n_{PUCCH}(1)$ | 0, 1 |
| 6 | NACK, ACK, NACK/DTX | $n_{PUCCH}(0)$ | 0, 0 |
| 7 | NACK/DTX, NACK/DTX, ACK | $n_{PUCCH}(2)$ | 0, 1 |
| 8 | NACK/DTX, NACK/DTX, NACK/DTX | $n_{PUCCH}(2)$ | 1, 0 |
| 9 | DTX, DTX, DTX | N/A | N/A |

In Table 2, for each HARQ-ACK field, one channel is used in two codewords and two channels are used in two codewords. For example for HARQ-ACK(0) when the information is NACK or NACK/DTX, $n_{PUCCH}(2)$ is used in two codewords, and $n_{PUCCH}(0)$ and $n_{PUCCH}(1)$ are used in one codeword each. For HARQ-ACK(1) when the information is ACK, $n_{PUCCH}(0)$ is used in two codewords and $n_{PUCCH}(1)$ and $n_{PUCCH}(2)$ are used in one codeword each. The usage of channels may be referred to as the channel distribution. Here, the channel distribution accounts for the number of codewords comprising a certain channel, but does not discriminate which channel that is used. Thus the distribution of the number of channels used is the same for any of the HARQ-ACK fields in Table 2. The invention is not limited to the particular allocations of channels or distributions contained in Table 2. One example of this is the following codebook.

TABLE 4

Example codebook for HARQ-ACK multiplexing with 3 bits.

| Entry Number | HARQ-ACK(0), HARQ-ACK(1), HARQ-ACK(2) | $n_{PUCCH}$ | b(0), b(1) |
|---|---|---|---|
| 1 | ACK, ACK, ACK | $n_{PUCCH}(1)$ | 1, 1 |
| 2 | ACK, ACK, NACK/DTX | $n_{PUCCH}(0)$ | 1, 1 |
| 3 | ACK, NACK, ACK | $n_{PUCCH}(2)$ | 0, 1 |
| 4 | ACK, NACK, NACK/DTX | $n_{PUCCH}(0)$ | 1, 0 |
| 5 | NACK, ACK, ACK | $n_{PUCCH}(1)$ | 0, 1 |
| 6 | NACK, ACK, NACK/DTX | $n_{PUCCH}(0)$ | 0, 1 |
| 7 | NACK/DTX, NACK/DTX, ACK | $n_{PUCCH}(2)$ | 0, 0 |
| 8 | NACK/DTX, NACK/DTX, NACK/DTX | $n_{PUCCH}(0)$ | 0, 0 |
| 9 | DTX, DTX, DTX | N/A | N/A |

The codewords in this codebook can be further arranged according to the encoded information for each HARQ-ACK field as follows.

TABLE 5

Grouping of codewords from the codebook in Table 1.

| NACK, NACK/DTX | | | ACK | | |
|---|---|---|---|---|---|
| HARQ-ACK(0) | HARQ-ACK(1) | HARQ-ACK(2) | HARQ-ACK(0) | HARQ-ACK(1) | HARQ-ACK(2) |
| ($n_{PUCCH}(1)$, 0, 1) | ($n_{PUCCH}(2)$, 0, 1) | ($n_{PUCCH}(0)$, 1, 1) | ($n_{PUCCH}(1)$, 1, 1) | ($n_{PUCCH}(1)$, 1, 1) | ($n_{PUCCH}(1)$, 1, 1) |
| ($n_{PUCCH}(0)$, 0, 1) | ($n_{PUCCH}(0)$, 1, 0) | ($n_{PUCCH}(0)$, 1, 0) | ($n_{PUCCH}(0)$, 1, 1) | ($n_{PUCCH}(0)$, 1, 1) | ($n_{PUCCH}(2)$, 0, 1) |
| ($n_{PUCCH}(2)$, 0, 0) | ($n_{PUCCH}(2)$, 0, 0) | ($n_{PUCCH}(0)$, 0, 1) | ($n_{PUCCH}(2)$, 0, 1) | ($n_{PUCCH}(1)$, 0, 1) | ($n_{PUCCH}(1)$, 0, 1) |
| ($n_{PUCCH}(0)$, 0, 0) | ($n_{PUCCH}(0)$, 0, 0) | ($n_{PUCCH}(0)$, 0, 0) | ($n_{PUCCH}(0)$, 1, 0) | ($n_{PUCCH}(0)$, 0, 1) | ($n_{PUCCH}(2)$, 0, 0) |

It can be seen from Table 5 that HARQ-ACK(0) has the same channel distribution for NACK, NACK/DTX as for ACK. HARQ-ACK(1) has the same channel distribution for NACK, NACK/DTX as for ACK and as HARQ-ACK(2) for ACK.

Table 5 also shows that the third embodiment applies. For example, HARQ-ACK(1) is using ($n_{PUCCH}(0)$,1,0) and ($n_{PUCCH}(0)$,0,0) to encode NACK or NACK/DTX, and ($n_{PUCCH}(0)$,1,1) and ($n_{PUCCH}(0)$,0,1) to encode ACK. Codeword ($n_{PUCCH}(0)$,1,0) is at the maximum distance from ($n_{PUCCH}(0)$,0,1) and codeword ($n_{PUCCH}(0)$,0,0) is at maximum distance from ($n_{PUCCH}(0)$,1,1).

Table 5 also shows that the first embodiment does not apply, since for HARQ-ACK(0), ($n_{PUCCH}(1)$,0,1) is not at the maximum distance from ($n_{PUCCH}(1)$,1,1).

The invention is applicable to any combination of one or several of the three embodiments.

The invention applies to at least one HARQ-ACK field in a codebook.

The invention is applicable to codebooks where the number of HARQ-ACK fields or the number of channels is not being equal to 3. One embodiment is a codebook with 2 fields and 2 channels, for example:

TABLE 6

Example codebook for HARQ-ACK multiplexing with 2 bits.

| Entry Number | HARQ-ACK(0), HARQ-ACK(1) | $n_{PUCCH}$ | b(0), b(1) |
|---|---|---|---|
| 1 | ACK, ACK | $n_{PUCCH}(1)$ | 1, 0 |
| 2 | ACK, NACK/DTX | $n_{PUCCH}(0)$ | 1, 1 |
| 3 | NACK, ACK | $n_{PUCCH}(1)$ | 0, 1 |
| 4 | NACK, NACK/DTX | $n_{PUCCH}(0)$ | 0, 0 |
| 5 | DTX, DTX | N/A | N/A |

Another embodiment is for a codebook consisting of 4 HARQ-ACK fields and 4 channels, or in general P HARQ-ACK fields and P'≠P channels.

Alternative Method

As an alternative, the method of the invention can be relaxed a bit by omitting the requirement that at least one of the S symbols is unused for any codeword. Such a relaxed method could be described as follows:

Method for encoding a number of feedback information messages in a mobile radio communications system using carrier aggregation, the method comprising: —encoding the number of feedback information messages by a set of codewords, where each feedback information message can be of at least a first kind or a second kind and each codeword comprises a channel selected from a number of A channels and a modulation symbol selected from a number of S modulation symbols. The method being distinguished in that for at least one feedback information message there is at least one codeword corresponding to information of the first kind and at least one codeword corresponding to information of the second kind, for which said at least one feedback information message the modulation symbol of one of said at least one codeword corresponding to information of the first kind and the modulation symbol of one of said at least one codeword corresponding to information of the second kind have a maximum distance, and wherein the codewords comprise the same channel and a different modulation symbol.

Such a relaxed method will, in contrast to the previously described method according to the invention also comprise embodiments where all modulation symbols of a channel are used for codewords. For instance, a system using four modulation symbols and further where two of the symbols are used for a first kind of information and the remaining two symbols are used for a second kind of information, is comprised by this relaxed method.

Thus, this relaxed method comprises a larger scope of possible codebooks, while still providing the advantage of maximising the probability of correctly receiving a feedback information message as described previously.

This relaxed method could potentially be combined with all the variants of the method of the invention originally described above to form a new cadre of embodiments of this relaxed method.

Terminal According to the Invention

The invention further comprises a terminal 320 for a mobile radio communications system 300 using carrier aggregation, the terminal being adapted to send a number of feedback information messages, wherein the terminal is adapted to encode the number of feedback information messages by a set of codewords, where each feedback information message can be of at least a first kind or a second kind and each codeword comprises a channel selected from a number of A channels and a modulation symbol selected from a number of S modulation symbols. The terminal is distinguished by that it is adapted such that for at least one feedback information message there is at least one codeword corresponding to information of the first kind and at least one codeword corresponding to information of the second kind, for which said at least one feedback information message the modulation symbol of one of said at least one codeword corresponding to information of the first kind and the modulation symbol of one of said at least one codeword corresponding to information of the second kind have a maximum distance, and wherein the codewords comprise the same channel and a different modulation symbol, and wherein for said at least one feedback information message at least one of the S symbols is unused for any codeword comprising said same channel.

Figure 4:
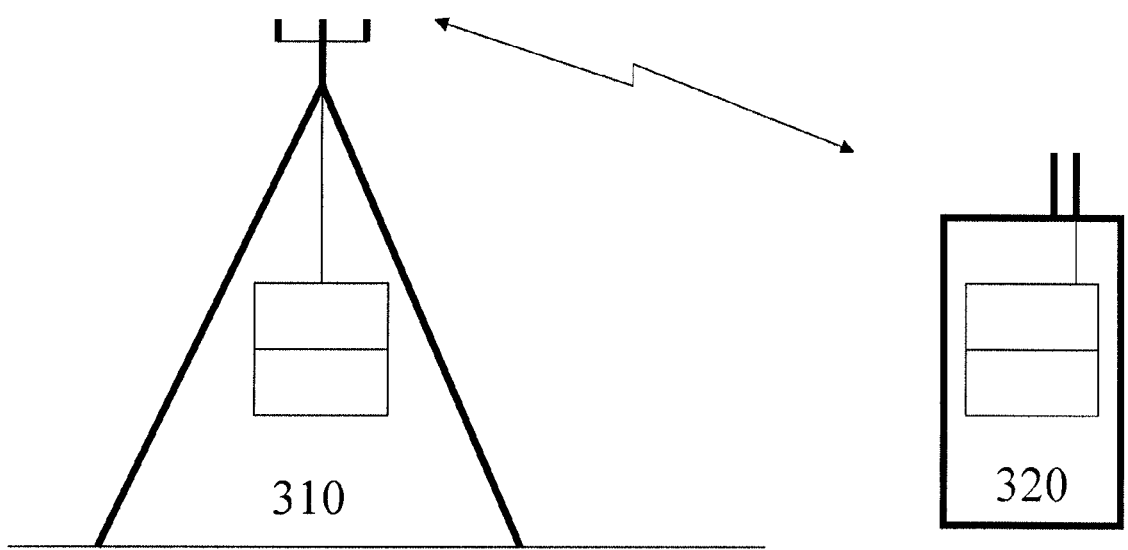
FIG. 4 illustrates a Radio basestation and a Mobile terminal.

The terminal constitutes the entity that is adapted to perform the parts of the method of the invention that are directed to a terminal. For instance, the terminal is adapted to send feedback information messages and to configure such feedback information messages such that they exhibit the properties of the invention. The terminal of the invention can be adapted to employ any particular embodiment of the method of the invention that relates to the terminal. FIG. 4 depicts a terminal 320.

Basestation According to the Invention

The invention further comprises a radio basestation 310 for a mobile radio communications system 300 using carrier aggregation, the basestation being adapted to receive a number of feedback information messages encoded by a (first) set of codewords, where each feedback information message can be of at least a first kind or a second kind and each codeword comprises a channel selected from a number of A channels and a modulation symbol selected from a number of S modulation symbols. The basestation is distinguished by that it is adapted such that for at least one feedback information message there is at least one codeword corresponding to information of the first kind and at least one codeword corresponding to information of the second kind, for which said at least one feedback information message the modulation symbol of one of said at least one codeword corresponding to information of the first kind and the modulation symbol of one of said at least one codeword corresponding to information of the second kind have a maximum distance, and wherein the codewords comprise the same channel and a different modulation symbol, and wherein for said at least one feedback information message at least one of the S symbols is unused for any codeword comprising said same channel.

The radio basestation constitutes the entity that is adapted to perform the parts of the method of the invention that are directed to a radio basestation. For instance, the radio basestation is adapted to receive feedback information messages by decoding such feedback information messages from codewords having the properties of the invention. The radio basestation of the invention can be adapted to employ any particular embodiment of the method of the invention that relates to the radio basestation. FIG. 4 depicts a radio basestation 310.

The size of the codebook, N, determines the amount of information that can be conveyed. Each state of information corresponds to a codeword and in the receiver, the most likely codeword in the codebook should be detected. For each detected codeword there are thus N−1 false candidate codewords in the codebook. The probability of making a detection error thus increases with the size of the codebook.

The radio basestation according to the invention can be further adapted to receive feedback information messages encoded by a second set of codewords, and upon having additional information about the communications system, it can be adapted to receive these feedback information messages encoded by the second set of codewords by using a subset of the second set of codewords in dependence on the additional information and wherein the subset of codewords has the same properties as the (first) set of codewords.

Thus, in one embodiment, the receiver has additional information of which feasible information states (i.e., entries in the codebook) the transmitter may use. By only performing detection of the feasible information states, the number of candidate codewords is reduced, which leads to an improved detection probability. The receiver can thus perform detection with a reduced size of the codebook.

Further, the radio basestation, when using additional information, can be adapted such that the additional information is that the basestation has refrained from scheduling data transmission in regard of at least one carrier for a mobile terminal and wherein the subset of codewords comprises those codewords from the second set of codewords which comprise Negative-Acknowledgment and Discontinuous Transmission (NACK/DTX) or DTX for the at least one carrier.

Thus, in one embodiment, the additional information comprises the carrier on which the transmitter has scheduled data for which uplink feedback (i.e., ACK, NACK, DTX) should be reported. For example, if the radio basestation (e.g. eNodeB in LTE) only scheduled data on a first carrier, it would only perform detection on the states in the codebook which comprises DTX on the second carrier, since the eNodeB knows that any ACK or NACK that is fed back and relates to the second carrier, is erroneous. For example, in Table 9, suppose HARQ-ACK(0) and HARQ-ACK(1) relates to a first carrier (e.g., a Primary Component Carrier, or a Primary Cell) and HARQ-ACK(2) and HARQ-ACK(3) relates to a second carrier (e.g., a Secondary Component Carrier, or a Secondary Cell). If the eNodeB only scheduled on the first carrier, it would only perform detection with entries 4, 8, 10 and 13.

These entries could equivalently be considered as a sub-codebook being arranged as in Table 7, comprising only the HARQ-ACK fields corresponding to the first carrier.

TABLE 7

Example sub-codebook from Table 9.

| Entry Number | HARQ-ACK(0), HARQ-ACK(1) | $n_{PUCCH}$ | QPSK |
|---|---|---|---|
| 1 (4) | ACK, ACK | $n_{PUCCH}(0)$ | 1, 1 |
| 2 (8) | ACK, NACK | $n_{PUCCH}(1)$ | 1, 0 |
| 3 (13) | NACK, ACK | $n_{PUCCH}(1)$ | 0, 1 |
| 4 (10) | NACK/DTX, NACK/DTX | $n_{PUCCH}(0)$ | 0, 0 |
| 5 | DTX, DTX | N/A | N/A |

The codewords in this codebook can be further arranged according to the encoded information for each HARQ-ACK field as follows, assuming NACK and NACK/DTX is grouped together as in Table 8.

TABLE 8

Grouping of codewords from the codebook in Table 7.

| | NACK, NACK/DTX | | ACK | |
|---|---|---|---|---|
| | HARQ-ACK(0) | HARQ-ACK(1) | HARQ-ACK(0) | HARQ-ACK(1) |
| | ($n_{PUCCH}(0)$, 0, 0) | ($n_{PUCCH}(1)$, 1, 0) | ($n_{PUCCH}(0)$, 1, 1) | ($n_{PUCCH}(0)$, 1, 1) |
| | ($n_{PUCCH}(1)$, 0, 1) | ($n_{PUCCH}(0)$, 0, 0) | ($n_{PUCCH}(1)$, 1, 0) | ($n_{PUCCH}(1)$, 0, 1) |

In a further embodiment, the sub-codebook comprises codewords for which the constellation points are at maximum distance, for codewords using the same channel and representing a first kind or second kind of information for a given HARQ-ACK field.

For example, it can be seen from Table 8 that the sub-codebook according to Table 7, fulfills the criteria of maximizing the distances of modulation symbols.

TABLE 9

Example codebook for HARQ-ACK multiplexing with 4 bits.

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(2)$ | 0, 0 |
| 2 | ACK, ACK, ACK, NACK | $n_{PUCCH}(3)$ | 0, 0 |
| 3 | ACK, ACK, NACK, ACK | $n_{PUCCH}(3)$ | 1, 0 |
| 4 | ACK, ACK, NACK/DTX, NACK/DTX | $n_{PUCCH}(0)$ | 1, 1 |
| 5 | ACK, NACK, ACK, ACK | $n_{PUCCH}(3)$ | 1, 1 |
| 6 | ACK, NACK, ACK, NACK | $n_{PUCCH}(0)$ | 1, 0 |
| 7 | ACK, NACK, NACK, ACK | $n_{PUCCH}(0)$ | 0, 1 |
| 8 | ACK, NACK, NACK/DTX, NACK/DTX | $n_{PUCCH}(1)$ | 1, 0 |
| 9 | NACK, ACK, ACK, ACK | $n_{PUCCH}(3)$ | 0, 1 |
| 10 | NACK/DTX, NACK/DTX, NACK/DTX, NACK/DTX | $n_{PUCCH}(0)$ | 0, 0 |
| 11 | NACK, ACK, ACK, NACK | $n_{PUCCH}(1)$ | 1, 1 |
| 12 | NACK, ACK, NACK, ACK | $n_{PUCCH}(1)$ | 0, 0 |
| 13 | NACK, ACK, NACK/DTX, NACK/DTX | $n_{PUCCH}(1)$ | 0, 1 |
| 14 | NACK/DTX, NACK/DTX, ACK, ACK | $n_{PUCCH}(2)$ | 1, 1 |
| 15 | NACK/DTX, NACK/DTX, ACK, NACK | $n_{PUCCH}(2)$ | 1, 0 |
| 16 | NACK/DTX, NACK/DTX, NACK, ACK | $n_{PUCCH}(2)$ | 0, 1 |
| 17 | DTX, DTX, DTX, DTX | N/A | N/A |

A further example of a codebook for HARQ-ACK multiplexing with 4 bits is given in Table 10.

TABLE 10

Example codebook for HARQ-ACK multiplexing with 4 bits.

| Entry Number | HARQ-ACK(0), HARQ-ACK(1), HARQ-ACK(2), HARQ-ACK(3) | $n_{PUCCH}$ | QPSK |
|---|---|---|---|
| 1 | ACK, ACK, ACK, ACK | $n_{PUCCH}(1)$ | 1, 1 |
| 2 | ACK, ACK, ACK, NACK | $n_{PUCCH}(1)$ | 0, 1 |
| 3 | ACK, ACK, NACK, ACK | $n_{PUCCH}(1)$ | 1, 0 |
| 4 | ACK, ACK, NACK/DTX, NACK/DTX | $n_{PUCCH}(1)$ | 0, 0 |
| 5 | ACK, NACK, ACK, ACK | $n_{PUCCH}(3)$ | 0, 1 |
| 6 | ACK, NACK, ACK, NACK | $n_{PUCCH}(3)$ | 1, 1 |
| 7 | ACK, NACK, NACK, ACK | $n_{PUCCH}(2)$ | 1, 1 |
| 8 | ACK, NACK, NACK/DTX, NACK/DTX | $n_{PUCCH}(0)$ | 1, 0 |
| 9 | NACK, ACK, ACK, ACK | $n_{PUCCH}(0)$ | 1, 1 |
| 10 | NACK/DTX, NACK/DTX, NACK/DTX, NACK/DTX | $n_{PUCCH}(0)$ | 0, 0 |
| 11 | NACK, ACK, ACK, NACK | $n_{PUCCH}(3)$ | 0, 0 |
| 12 | NACK, ACK, NACK, ACK | $n_{PUCCH}(2)$ | 0, 0 |
| 13 | NACK, ACK, NACK/DTX, NACK/DTX | $n_{PUCCH}(0)$ | 0, 1 |
| 14 | NACK/DTX, NACK/DTX, ACK, ACK | $n_{PUCCH}(2)$ | 1, 0 |
| 15 | NACK/DTX, NACK/DTX, ACK, NACK | $n_{PUCCH}(3)$ | 1, 0 |
| 16 | NACK/DTX, NACK/DTX, NACK, ACK | $n_{PUCCH}(2)$ | 0, 1 |
| 17 | DTX, DTX, DTX, DTX | N/A | N/A |

Similarly as above, the sub-codebook will be as in Table 11.

TABLE 11

Example sub-codebook from Table 10.

| Entry Number | HARQ-ACK(0), HARQ-ACK(1) | $n_{PUCCH}$ | QPSK |
|---|---|---|---|
| 1 (4) | ACK, ACK | $n_{PUCCH}(1)$ | 0, 0 |
| 2 (8) | ACK, NACK | $n_{PUCCH}(0)$ | 1, 0 |
| 3 (13) | NACK, ACK | $n_{PUCCH}(0)$ | 0, 1 |
| 4 (10) | NACK/DTX, NACK/DTX | $n_{PUCCH}(0)$ | 0, 0 |
| 5 | DTX, DTX | N/A | N/A |

The codewords in this codebook can be further arranged according to the encoded information for each HARQ-ACK field as follows, assuming NACK and NACK/DTX is grouped together as in Table 12.

TABLE 12

Grouping of codewords from the codebook in Table 11

| | NACK, NACK/DTX | | ACK | |
|---|---|---|---|---|
| | HARQ-ACK(0) | HARQ-ACK(1) | HARQ-ACK(0) | HARQ-ACK(1) |
| | ($n_{PUCCH}(0)$, 0, 0) | ($n_{PUCCH}(0)$, 0, 0) | ($n_{PUCCH}(1)$, 0, 0) | ($n_{PUCCH}(1)$, 0, 0) |
| | ($n_{PUCCH}(0)$, 0, 1) | ($n_{PUCCH}(0)$, 1, 0) | ($n_{PUCCH}(0)$, 1, 0) | ($n_{PUCCH}(0)$, 0, 1) |

It can be observed from Table 12 that the second embodiment applies, e.g., for HARQ-ACK(0) ($n_{PUCCH}(0)$,0,1) is at maximum distance from ($n_{PUCCH}(0)$,1,0).

Further Alternative Example

As a further example of HARQ-ACK multiplexing with 3 bits, the following codebook is given.

TABLE 13

Example codebook for HARQ-ACK multiplexing with 3 bits.

| Entry Number | HARQ-ACK(0), HARQ-ACK(1), HARQ-ACK(2) | $n_{PUCCH}$ | b(0), b(1) |
|---|---|---|---|
| 1 | ACK, ACK, ACK | $n_{PUCCH}(1)$ | 1, 1 |
| 2 | ACK, ACK, NACK/DTX | $n_{PUCCH}(1)$ | 0, 0 |
| 3 | ACK, NACK, ACK | $n_{PUCCH}(1)$ | 1, 0 |
| 4 | ACK, NACK, NACK/DTX | $n_{PUCCH}(0)$ | 1, 0 |
| 5 | NACK, ACK, ACK | $n_{PUCCH}(1)$ | 0, 1 |
| 6 | NACK, ACK, NACK/DTX | $n_{PUCCH}(0)$ | 0, 1 |
| 7 | NACK/DTX, NACK/DTX, ACK | $n_{PUCCH}(2)$ | 1, 1 |
| 8 | NACK/DTX, NACK/DTX, NACK/DTX | $n_{PUCCH}(2)$ | 0, 0 |
| 9 | DTX, DTX, DTX | N/A | N/A |

The codewords in this codebook can be further arranged according to the encoded information for each HARQ-ACK field as follows, assuming NACK and NACK/DTX is grouped together.

TABLE 14

Ordering of codewords from the codebook in Table 13.

| NACK, NACK/DTX | | | ACK | | |
|---|---|---|---|---|---|
| HARQ-ACK(0) | HARQ-ACK(1) | HARQ-ACK(2) | HARQ-ACK(0) | HARQ-ACK(1) | HARQ-ACK(2) |
| $(n_{PUCCH}(1), 0, 1)$ | $(n_{PUCCH}(0), 1, 0)$ | $(n_{PUCCH}(0), 0, 1)$ | $(n_{PUCCH}(1), 1, 1)$ | $(n_{PUCCH}(1), 1, 1)$ | $(n_{PUCCH}(1), 1, 1)$ |
| $(n_{PUCCH}(0), 0, 1)$ | $(n_{PUCCH}(1), 1, 0)$ | $(n_{PUCCH}(1), 0, 0)$ | $(n_{PUCCH}(0), 1, 0)$ | $(n_{PUCCH}(0), 0, 1)$ | $(n_{PUCCH}(1), 1, 0)$ |
| $(n_{PUCCH}(2), 1, 1)$ | $(n_{PUCCH}(2), 1, 1)$ | $(n_{PUCCH}(0), 1, 0)$ | $(n_{PUCCH}(1), 1, 0)$ | $(n_{PUCCH}(1), 0, 0)$ | $(n_{PUCCH}(1), 0, 1)$ |
| $(n_{PUCCH}(2), 0, 0)$ | $(n_{PUCCH}(2), 0, 0)$ | $(n_{PUCCH}(2), 0, 0)$ | $(n_{PUCCH}(1), 0, 0)$ | $(n_{PUCCH}(1), 0, 1)$ | $(n_{PUCCH}(2), 1, 1)$ |

In this example the channel distribution is different for the NACK,NACK/DTX codewords and the ACK codewords. For example for any HARQ-ACK field for NACK or NACK/DTX, 2 codewords comprise 1 channel and 2 codewords comprise 2 different channels. However, for any HARQ-ACK field for ACK, 3 codewords comprise 1 channel and 1 codeword comprises 1 channel. By inspection of Table 14, it is seen that for each HARQ-ACK field, there is one codeword for NACK,NACK/DTX which is at maximum distance from one codeword for ACK. Thus, the first embodiment can be used even if the channel distributions are different for the different kinds of information.

APPLICATIONS AND ALTERNATIVES

The invention is applicable to systems with multiple carriers which signals control information in the uplink.

The invention claimed is:

1. A method for communication of a number of feedback information messages in a mobile radio communications system using carrier aggregation, the method comprising:
receiving a number of feedback information messages encoded by a set of codewords, where each feedback information message is of at least a first kind or a second kind and each codeword comprises a channel selected from a number of A channels and a modulation symbol selected from a number of S modulation symbols,
wherein for a feedback information message there is at least a first codeword corresponding to information of the first kind and at least a second codeword corresponding to information of the second kind, for said feedback information message a modulation symbol of said first codeword and a modulation symbol of said second codeword have a maximum distance, and wherein the codewords comprise the same channel and a different modulation symbol, and wherein for said feedback information message at least one of the S modulation symbols is unused for any codeword comprising said same channel.

2. The method according to claim 1, wherein the maximum distance is a Euclidean distance in a signal space.

3. The method according to claim 1, wherein, for the feedback information message, there is only one codeword corresponding to information of the first kind and only one codeword corresponding to information of the second kind.

4. The method according to claim 1, wherein, for the feedback information message, there is one codeword corresponding to information of the first kind and two codewords corresponding to information of the second kind.

5. The method according to claim 1, wherein the first kind of information at least one of
Negative-Acknowledgement, NACK,
Negative-Acknowledgement, NACK/Discontinuous Transmission, DTX,
Discontinuous Transmission, DTX;
the second kind of information comprises Acknowledgement, ACK.

6. The method according to claim 1, wherein the feedback information message relates to Multiple Input-Multiple Output, MIMO, feedback.

7. The method, according to claim 1, wherein the feedback information message relates to Hybrid automatic repeat request, HARQ.

8. The method according to claim 1, wherein each of the A channels corresponds to a sequence.

9. The method according to claim 1, wherein there is a same channel distribution for at least two of said feedback information messages.

10. The method according to claim 1, wherein properties of the feedback information message apply for all feedback information messages.

11. The method according to claim 10, wherein in regard of a feedback information message there is a pattern, the pattern comprising:
a first number of codewords comprising a same channel and related to a first kind of information, and a second number of codewords comprising said same channel and related to the second kind of information,
and wherein said pattern holds true for all feedback information messages.

12. The method according to claim 1, wherein the number of feedback information messages is 2 or 3.

13. The method according to claim 1, wherein the number of modulation symbols S is 4.

14. The method according to claim 13, wherein the modulation is Gray coded Quadrature Phase Shift Keying, QPSK.

15. The method according to claim 1, wherein the mobile radio communications system is Long Term Evolution Advanced.

16. The method according to claim 1, wherein the number of said feedback information messages are configured by higher layer signalling.

17. A non-transitory computer readable medium having computer executable instructions, which, when executed by a computer, cause the computer to:

receive a number of feedback information messages encoded by a set of codewords, where each feedback information message is of at least a first kind or a second kind and each codeword comprises a channel selected from a number of A channels and a modulation symbol selected from a number of S modulation symbols, wherein for a feedback information message there is at least a first codeword corresponding to information of the first kind and at least a second codeword corresponding to information of the second kind, for said feedback information message a modulation symbol of said first codeword and a modulation symbol of said second codeword have a maximum distance, and wherein the codewords comprise the same channel and a different modulation symbol, and wherein for said feedback information message at least one of the S modulation symbols is unused for any codeword comprising said same channel.

* * * * *